US007443782B2

(12) United States Patent
Yang et al.

(10) Patent No.: US 7,443,782 B2
(45) Date of Patent: Oct. 28, 2008

(54) ADAPTIVE INTER-CARRIER INTERFERENCE SELF-CANCELLATION METHOD AND TRANSCEIVER THEREOF

(75) Inventors: Hongwei Yang, Shanghai (CN); Guangjie Li, Shanghai (CN)

(73) Assignee: Alcatel, Paris (FR)

( * ) Notice: Subject to any disclaimer, the term of this patent is extended or adjusted under 35 U.S.C. 154(b) by 766 days.

(21) Appl. No.: 10/747,187

(22) Filed: Dec. 30, 2003

(65) Prior Publication Data

US 2004/0151254 A1    Aug. 5, 2004

(30) Foreign Application Priority Data

Dec. 31, 2002    (CN)    ................ 02 1 60551

(51) Int. Cl.
    *H04J 11/00* (2006.01)
(52) U.S. Cl. .................. 370/203; 370/343; 375/260
(58) Field of Classification Search .......... 370/203, 370/204, 206, 210, 343, 480, 482; 375/260, 375/362, 344, 356, 358
    See application file for complete search history.

(56) References Cited

U.S. PATENT DOCUMENTS

| 6,175,550 | B1 * | 1/2001 | van Nee | .............. 370/206 |
| 6,353,642 | B1 * | 3/2002 | Asahara et al. | .............. 375/344 |
| 2002/0186796 | A1 * | 12/2002 | McFarland et al. | ........... 375/341 |
| 2004/0120410 | A1 * | 6/2004 | Priotti | ..................... 375/260 |

OTHER PUBLICATIONS

J. Ahn et al, "Frequency Domain Equalisation of OFDM Signals Over Frequency Nonselective Rayleigh Fading Channels" Electronics Letters, Aug. 5, 993, vol. 29, No. 16, pp. 1476-1477.
Yuping Zhao, "Intercarrier Interference Self-Cancellation Scheme for OFDM Mobile Communication Systems", IEEE Transactions on Communications, vol. 49, No. 7, Jul. 2001, pp. 1185-1191.
Jean Armstrong, "Analysis of New Existing Method of Reducing Intercarrier Interference Due to Carrier Frequency Offset in OFDM", pp. 365-369.

* cited by examiner

*Primary Examiner*—Wing F. Chan
*Assistant Examiner*—Saba Tsegaye
(74) *Attorney, Agent, or Firm*—Sughrue Mion, PLLC

(57) ABSTRACT

The present invention discloses an adaptive ICI self-cancellation method, which can adapt to the dynamical change of frequency offset and signal-noise power ratio (SNR), and a device thereof. The adaptive ICI self-cancellation method of the present invention comprises the steps of: estimating the maximum frequency offset and signal-noise power ratio (SNR) of signals, selecting a modulating state in accordance with an adaptive strategy, and determining a demodulating state based on the selected modulating state. An adaptive inter-carrier interference self-cancellation device using the method comprises: a transmitter including a digital demodulator, an inter-carrier interference self-cancellation modulator and an adaptive controller; and a receiver including a digital demodulator, an inter-carrier interference self-cancellation demodulator, a fast Fourier transformer, an estimator, a signaling demodulator and a demodulation controller. Through the present invention, the cancellation of inter-carrier interference is achieved, and at the same time the working state of the digital modulator and the ICI self-cancellation modulator satisfies the highest spectrum efficiency.

21 Claims, 3 Drawing Sheets

ADAPTIVE INTER-CARRIER INTERFERENCE SELF-CANCELLATION METHOD AND TRANSCEIVER THEREOF

CROSS-REFERENCE TO RELATED APPLICATION(S)

This application is based on Chinese Patent Application No. 02160551.3 filed Dec. 31, 2002, the disclosure of which is hereby incorporated by reference thereto in its entirety, and the priority of which is hereby claimed under 35 U.S.C. §119.

FIELD OF THE INVENTION

The present invention relates to an orthogonal frequency-division multiplexing (OFDM) system. In particular, the present invention relates to an adaptive inter-carrier inference (ICI) self-cancellation method and a transmitter and a receiver for executing the method in OFDM system.

BACKGROUND OF THE INVENTION

Orthogonal frequency-division multiplexing (OFDM) system is a popular digital radio communication system. Since there exists the ICI, communication reliability of the system will reduce. Therefore, many methods are used to cancel ICI for OFDM system and improve the communication reliability of the system. The existing methods for canceling ICI mainly include: frequency-domain equalization, time-domain windowing, and fixed ICI self-cancellation scheme. With reference to FIG. 1, an introduction is made in the following to the fixed ICI self-cancellation scheme, which is the closest method to the present invention.

FIG. 1 shows the structure of the relevant parts of two communication devices of the fixed ICI self-cancellation scheme, wherein the upper half part shows a transmitter of a communication device, while the lower half part shows a receiver of other communication device. Fixed ICI self-cancellation scheme implemented in the transmitter and receiver comprises the following two simple steps:

(1) at the transmitter side of the communication device, one data symbol is modulated into a group of adjacent sub-carriers with a group of weighting coefficients. For a group length of $L$, the optimum weighting coefficients should be designed to satisfy the polynomial $P(D)=(1-D)^{L-1}$, where $D$ denotes a subcarrier delay unit in the discrete frequency domain.

(2) at the receiver side of the other communication device, the received signals on these subcarriers frequencies are linearly combined with the proposed weighting coefficients.

By modulating a data symbol onto a group of adjacent subcarriers with predefined weighting coefficients and demodulating signals with the weighting coefficients, the fixed ICI self-cancellation scheme can have the ICI generated within a group self-cancelled each other at the receiver side. However, the function as reducing the ICI by such a repetition coding is at the cost of lowering spectrum efficiency.

The future radio communication system will be designed to combat larger frequency offset arising from higher frequency and higher mobility. In such a radio operation environment, the fixed ICI self-cancellation modulation scheme with larger group size to ensure the validity of communication must lead to lower spectrum efficiency, and the fixed modulation with comparatively higher spectrum efficiency hardly ensures the reliability of communication. It's impossible for fixed ICI self-cancellation scheme to optimize the spectrum efficiency at the prerequisite of a given performance requirement.

Therefore, there is a need for a method and a device for canceling the ICI which can not only meet the given performance requirement but also optimize the spectrum efficiency.

SUMMARY OF THE INVENTION

In order to resolve the above-mentioned problems, the object of the present invention is to provide an adaptive ICI self-cancellation method, which can adapt to the dynamical change of frequency offset and signal-noise power ratio (SNR), and a device thereof.

The adaptive ICI self-cancellation method of the present invention comprises the steps of:

after the system starts operation, modulating and demodulating date according to the predetermined operation mode, and then, a) estimating in a communication device the maximum frequency offset and signal-noise power ratio (SNR) of signals transmitted by other communication device via a transmission channel;

b) by using the maximum frequency offset and SNR estimated in the above step a) in the other communication device, selecting the working state of a digital modulator and an ICI self-cancellation modulator based on an adaptive strategy, and controlling the digital modulator and the ICI self-cancellation modulator to work in accordance with the working state;

c) based on the working state of the digital modulator and the ICI self-cancellation modulator in the other communication device selected in the above step b), determining the corresponding working state of a digital demodulator and an ICI self-cancellation demodulator in the communication device, and controlling the digital modulator and the ICI self-cancellation modulator to work in accordance with the working state; and repeating periodically the above-mentioned steps a) b), and c).

An adaptive ICI self-cancellation device adopting the method comprises:

a transmitter of communication device in OFDM system, comprising a digital modulator, an ICI self-cancellation modulator connected to the digital modulator, and an adaptive controller in association with the transmitter at work.

The adaptive controller receives the maximum frequency offset and SNR estimated by an estimator of other communication device by using a communication device where the transmitter is located, selecting the working state of the digital modulator and the ICI self-cancellation modulator based on an adaptive strategy, and controlling the digital modulator and the ICI self-cancellation modulator to work in accordance with the working state.

Wherein, the adaptive strategy means that the working state of a digital modulator and an ICI self-cancellation modulator, which is selected according to the maximum frequency offset and SNR, satisfies the highest spectrum efficiency at a given an bit error rate requirement.

A receiver of communication device in OFDM system, comprising a digital demodulator, an ICI self-cancellation demodulator connected to the digital demodulator, a fast Fourier transformer for fast Fourier transforming demodulated signals and outputting to the ICI self-cancellation demodulator, an estimator in association with the receiver at work, a signaling demodulator in association with the receiver at work and a demodulation controller in association with the receiver at work.

The estimator estimates from signals sent from a baseband filter the maximum frequency offset and SNR of signals transmitted from other communication device via a transmission channel, the maximum frequency offset and SNR obtained from the estimation returning to the other communication device via the communication device where the receiver is located;

The signaling demodulator signaling demodulates signals that have been transformed by a fast Fourier transformer.

The demodulation controller obtains from signaling that have been demodulated by a signaling demodulator the working state, transmitted by other communication device, of a digital modulator and the ICI self-cancellation modulator of the other communication device, determining the corresponding working state of the digital demodulator and the ICI self-cancellation demodulator, and controlling the digital modulator and the ICI self-cancellation modulator to work in accordance with the working state.

As described above, the present invention can reduce the ICI and make the working state of the digital demodulator and the ICI self-cancellation demodulator satisfy the highest spectrum efficiency.

BRIEF DESCRIPTION ON THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail in accordance with the accompanying drawings.

Figure 1:
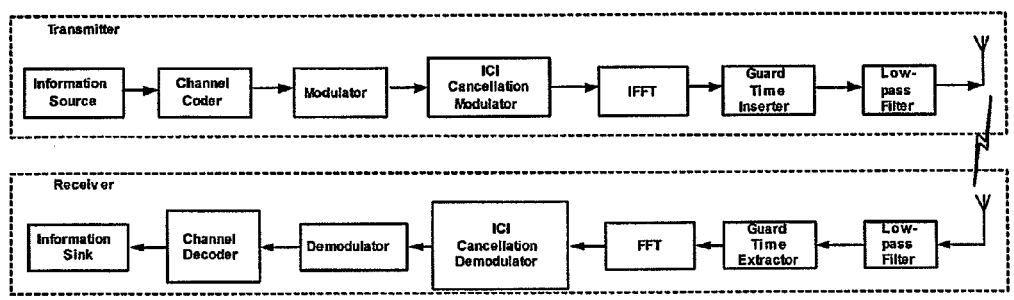
FIG. 1 is a block diagram of a conventional communication device with a fixed ICI self-cancellation scheme.
Figure 2:
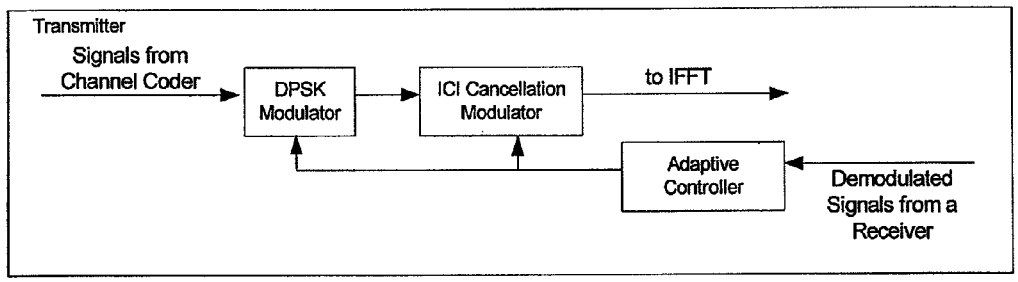
FIG. 2 is a block diagram of a transmitter in accordance with a preferred embodiment of the present invention.
Figure 3:
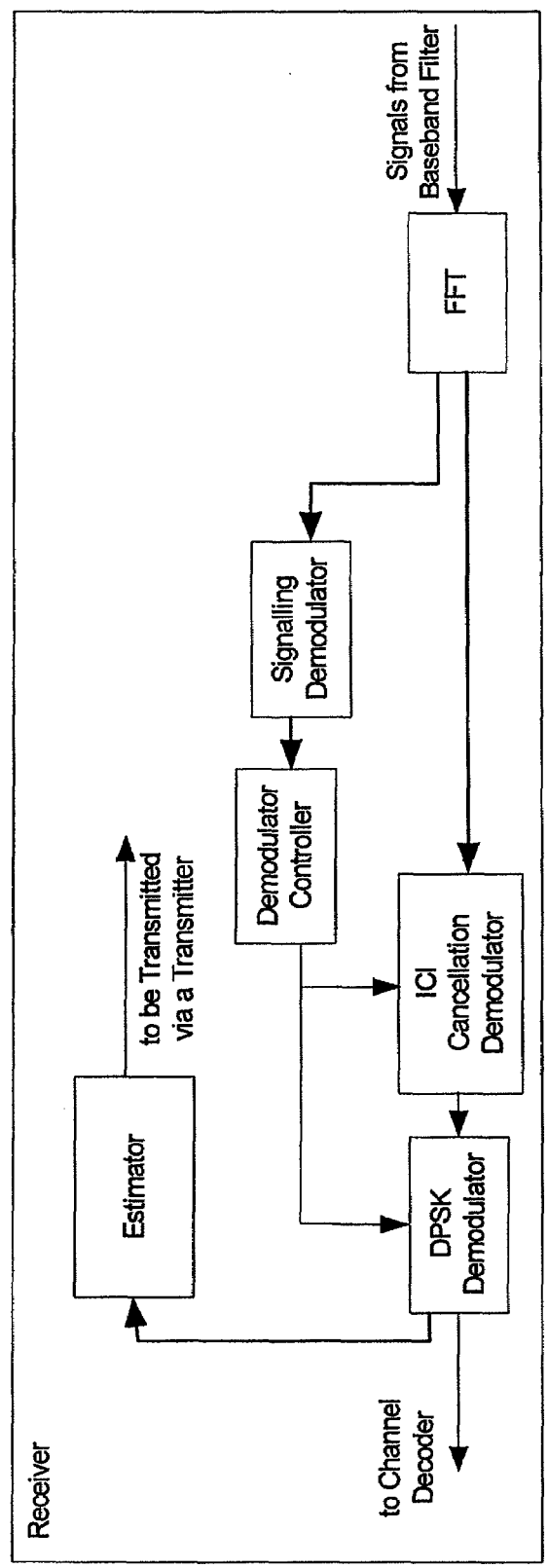
FIG. 3 is a block diagram of a receiver in accordance with a preferred embodiment of the present invention.

In a preferred embodiment of the present invention as shown in FIGS. 2 and 3, the adaptive ICI cancellation device relates to a transmitter of a communication device and a receiver of other communication device. Where:

The transmitter of the communication device includes a difference phase-shift key (DPSK) modulator, an ICI self-cancellation modulator connected to the DPSK modulator, and a adaptive controller in association with the transmitter at work. The DPSK modulator may be replaced by other digital modulators such as a phase-shift key (PSK) modulator and a quadrature amplitude modulation (QAM) modulator. Other components of the transmitter are identical with that of the prior art, thereby are not shown here.

In the present embodiment, the working states of the DPSK modulator include, but are not limited to, no transmission (M1), 2-DPSK (M2) and 4-DPSK (M3). It is possible that the DPSK modulator has more working states. In other embodiments more else working states of the DPSK modulator may be set upon requirements.

The working states of the ICI self-cancellation modulator includes, but are not limited to, standard ($T_1$), linear ($T_2$) and cubic ($T_3$). It is possible that the ICI self-cancellation modulator has more working states. In other embodiments more else working states of the ICI self-cancellation modulator may be set upon requirements.

In the present embodiment, the adaptive controller receives the demodulated signals from a receiver of the communication device at the same side. That is to say, by using the communication device where the transmitter is located to receive the maximum frequency offset and SNR estimated by an estimator of communication device at other side and according to a adaptive strategy, the adaptive controller selects the working state of the DPSK modulator connected to the output of the adaptive controller or other digital modulators and the ICI self-cancellation modulator, and controls the DPSK modulator or other digital modulators and the ICI self-cancellation modulator to work in accordance with the selected working state.

Where, a adaptive strategy means that the working state of the digital modulator and the ICI self-cancellation modulator, which is selected in accordance with the maximum frequency offset and SNR, satisfies the highest spectrum efficiency at a given bit error rate requirement.

Figure 4:
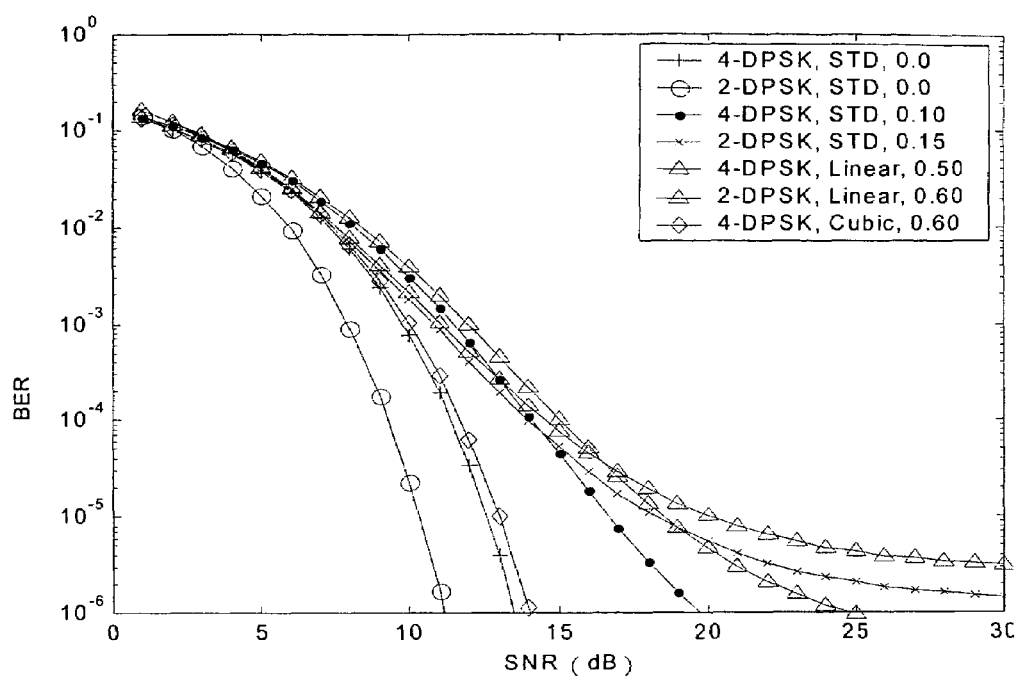
FIG. 4 is a chart of the working state of an adaptive ICI self-cancellation in accordance with a preferred embodiment of the present invention.

FIG. 4 shows a BER-SNR candidate mode function curves of a DPSK modulator and an ICI self-cancellation modulator at a given frequency offset in an additive Gaussian white noise channel measured from an experiment. In the curves, the bit error rate less than 10-5 can achieve the required system function. In a curve that satisfies the prerequisite, the most efficient candidate mode is to be selected. The modulation efficiencies corresponding to the three states of a DPSK modulator as non-transmission (M1), 2-DPSK (M2) and 4-DPSK (M3) correspond to 0, 1, and 2, respectively, while those corresponding to other selectable working states are deduced by analogy. The modulation efficiencies of an ICI self-cancellation modulator corresponding to the three states as standard (T1), linear (T2), and cubic (T3) correspond to 1, ½, and ⅓, respectively, while those corresponding to other selectable working states are deduced by analogy. The product of multiplying these efficiencies is the system efficiency in the working mode. The larger the product, the higher the efficiency. According to a self adaptation strategy, a table of the working states of a PSK modulator and an ICI self-cancellation modulator, in which working states correspond to different SNR and different maximum frequency offset, is made out of curves in FIG. 4 and stored as follows.

|  | $\Delta f = 0$ | $0 < \Delta f < 0.1$ | $0.1 \leq \Delta f < 0.15$ | $0.15 \leq \Delta f < 0.5$ | $0.5 \leq \Delta f < 0.6$ | $f_5 > 0.6$ |
|---|---|---|---|---|---|---|
| SNR $\leq$ 10.3 dB | $M_1$ | $M_1$ | $M_1$ | $M_1$ | $M_1$ | $M_1$ |
| 10.3 < SNR $\leq$ 12.6 dB | $M_2, T_1$ | | | | | |
| 12.6 < SNR $\leq$ 13 dB | $M_3, T_1$ | | | | | |
| 13 < SNR $\leq$ 16.6 dB | | $M_3, T_3$ | $M_3, T_3$ | $M_3, T_3$ | $M_3, T_3$ | |
| 16.6 < SNR $\leq$ 18.3 dB | | $M_3, T_1$ | | | | |
| 18.3 dB < SNR | | | $M_2, T_1$ | $M_3, T_2$ | | |

Therefore, the process of selecting the working state of a digital modulator and an ICI self-cancellation modulator in accordance with a self adaptation strategy may be completed by searching a table made and stored beforehand.

A receiver of other communication device includes a DPSK demodulator, an ICI self-cancellation demodulator connected to the DPSK demodulator, a fast Fourier transformer connected to the ICI self-cancellation demodulator, and an estimator, a signaling demodulator as well as a demodulation controller correlative to the receiver at work. Other components of the receiver are identical with that of the prior art, are not shown here.

With signals output from the digital demodulator being its input signals, the estimator estimates the maximum frequency offset and SNR of signals transmitted by the communication device at the opposite side of communication via a transmission channel. In the present embodiment, although the estimator performs estimation through the outputs from the digital demodulator, it may also estimate the maximum frequency offset and SNR of signals directly from a baseband filter without being fast Fourier transformed or demodulated. The maximum frequency offset and SNR obtained from the estimation return to the communication device at the opposite side of communication via the communication device where the receiver is located.

In other embodiments, the above-mentioned DPSK demodulator may also be other digital demodulators corresponding to the digital demodulator of a transmitter, such as a PSK modulator, a QAM modulator. The selectable modes of the DPSK demodulator or other digital modulators and the ICI self-cancellation modulator correspond to those of the DPSK modulator of a transmitter or other digital modulators and an ICI self-cancellation modulator.

After the fast Fourier transformer transforms the signals from a baseband filter, the signaling demodulator receives and signaling demodulates the transformed signals. Based on the demodulated signaling by the signaling demodulator, the demodulation controller obtains the working states of a DPSK modulator or other digital modulators and the ICI self-cancellation modulator of communication device at other side, which are transmitted by a communication device at the opposite side of communication, thereby determines the corresponding working states of the DPSK demodulator or other digital demodulators and the ICI self-cancellation demodulator connected to the output of the demodulation controller at work, and controls the DPSK demodulator or other digital demodulators and the ICI self-cancellation demodulator to work in accordance with the working states.

Other components of the present device and functions thereof are well known to a person skilled in the art, and therefore detailed description is omitted.

As described above, a method of the present invention can be summarized as follows:

a) estimating in a communication device the maximum frequency offset and signal-noise power ratio (SNR) of signals transmitted by other communication device via a transmission channel;

b) by using the maximum frequency offset and SNR estimated in the above step a) in the other communication device, selecting the working state of a digital modulator and an ICI self-cancellation modulator based on an adaptive strategy, and controlling the digital modulator and the ICI self-cancellation modulator to work in accordance with the working state;

c) based on the working state of the digital modulator and the ICI self-cancellation modulator in the other communication device selected in the above step b), determining the corresponding working state of a digital demodulator and an ICI self-cancellation demodulator in the communication device, and controlling the digital modulator and the ICI self-cancellation modulator to work in accordance with the working state; and repeating periodically the above-mentioned steps a), b), and c).

Where, the adaptive strategy in step b) means that the working state of a digital modulator and an ICI self-cancellation modulator, which is selected according to the maximum frequency offset and SNR, satisfies the highest spectrum efficiency at a given an bit error rate requirement.

Where, "selecting the working state of a digital and an ICI self-cancellation modulator based on an adaptive strategy" in step b) can be completed by searching a table made and stored beforehand, and in that the table can be made in accordance with a group of curves of bit error rate and SNR, which curves are pre-measured by experiment according to different working states of a digital modulator and an ICI self-cancellation modulator and different frequency offsets, and the adaptive strategy as well.

Where, in the table the working states of each digital modulator and ICI self-cancellation modulator corresponding to each SNR and maximum frequency offset satisfies the highest spectrum efficiency at a given bit error rate requirement.

As many apparently widely different embodiments of the present invention can be made without departing from the spirit and scope thereof, it is to be understood that the invention is not limited to the specific embodiments thereof except as defined in the appended claims.

What is claimed is:

1. An adaptive inter-carrier interference (ICI) self-cancellation method for an orthogonal frequency-division multiplexing (OFDM) system, the method comprising the steps of:
   a) estimating in a first communication device a maximum frequency offset and signal-noise power ratio (SNR) of signals transmitted by a second communication device via a transmission channel;
   b) using the maximum frequency offset and SNR estimated in the step a) in said second communication device to select a working state of a digital modulator and an ICI self-cancellation modulator based on an adaptive strategy, and controlling said digital modulator and said ICI self-cancellation modulator to work in accordance with said working state;
   c) based on the working state of the digital modulator and the ICI self-cancellation modulator in said second communication device selected in the step b), determining, in the first communication device, the corresponding working state of a digital demodulator and an ICI self-cancellation demodulator in said first communication device, and controlling said digital demodulator and said ICI self-cancellation demodulator to work in accordance with said working state; and
   repeating periodically steps a), b), and c).

2. A method according to claim 1, wherein the adaptive strategy in step b) means that the working state of the digital modulator and the ICI self-cancellation modulator, which is selected according to the maximum frequency offset and SNR, satisfies the highest spectrum efficiency at a given an bit error rate requirement.

3. A method according to claim 1, wherein the selecting the working state of a digital and an ICI self-cancellation modulator based on an adaptive strategy in step b) can be completed by searching a table made and stored beforehand, and in that said table can be made in accordance with a group of curves of bit error rate and SNR, which curves are pre-measured by experiment according to different working states of the digital modulator and the ICI self-cancellation modulator and different frequency offsets, and said adaptive strategy.

4. A method according to claim 3, wherein in said table the working states of each digital modulator and ICI self-cancellation modulator corresponding to each SNR and maximum frequency offset satisfies the highest spectrum efficiency at a given bit error rate requirement.

5. A method according to claim 3, wherein said digital modulator is a difference phase-shift key (DPSK) modulator, and that said digital demodulator is a difference phase-shift key (DPSK) demodulator.

6. A method according to claim 5, wherein the working state of said DPSK modulator includes: non-transmission (M1), 2-DPSK (M2) and 4-DPSK (M3), the modulation efficiencies of the three states corresponding to 0, 1, and 2, respectively; and in that the working state of said ICI self-cancellation modulator includes: standard (T1), linear (T2), and three times (T3), the modulation efficiencies of the three states corresponding to 1, ½, and ⅓, respectively.

7. A method according to claim 3, wherein said digital modulator is a phase-shift key (PSK) modulator, and that said digital demodulator is a phase-shift key (PSK) demodulator.

8. A method according to claim 3, wherein said digital modulator is a quadrature amplitude modulation (QAM) modulator, and that said digital demodulator is a quadrature amplitude modulation (QAM) demodulator.

9. A transmitter of a first communication device in an orthogonal frequency-division multiplexing (OFDM) system, comprising a digital modulator and an inter-carrier interference (ICI) self-cancellation modulator connected to said digital modulator, said transmitter further comprises:
an adaptive controller in association with said transmitter of the first communication device at work for receiving a maximum frequency offset and signal-noise power ratio (SNR) estimated by an estimator of a second communication device by using the first communication device where said transmitter is located, selecting a working state of said digital modulator and said ICI self-cancellation modulator based on an adaptive strategy, and controlling said digital modulator and said ICI self-cancellation modulator to work in accordance with said working state.

10. A transmitter according to claim 9, wherein the adaptive strategy means that the working state of a digital modulator and an ICI self-cancellation modulator, which is selected according to the maximum frequency offset and SNR, satisfies the highest spectrum efficiency at a given an bit error rate requirement.

11. A transmitter according to claim 9, wherein the selecting the working state of a digital and an ICI self-cancellation modulator based on an adaptive strategy in said adaptive controller can be completed by searching a table made and stored beforehand, and in that said table can be made in accordance with a group of curves of bit error rate and SNR, which curves are pre-measured by experiment according to different working states of a digital modulator and an ICI self-cancellation modulator and different frequency offsets, and said adaptive strategy as well.

12. A transmitter according to claim 11, wherein in said table the working states of each digital modulator and ICI self-cancellation modulator corresponding to each SNR and maximum frequency offset satisfies the highest spectrum efficiency at a given bit error rate requirement.

13. A transmitter according to claim 11, wherein said digital modulator is a difference phase-shift key (DPSK) modulator.

14. A transmitter according to claim 13, wherein the working state of said DPSK modulator includes: non-transmission (M1), 2-DPSK (M2) and 4-DPSK (M3), the modulation efficiencies of the three states corresponding to 0, 1, and 2, respectively; and in that the working state of said ICI self-cancellation modulator includes: standard (T1), linear (T2), and three times (T3), the modulation efficiencies of the three states corresponding to 1, ½, and ⅓, respectively.

15. A transmitter according to claim 11, wherein said digital modulator is a phase-shift key (PSK) modulator.

16. A transmitter according to claim 11, wherein said digital modulator is a quadrature amplitude modulation (QAM) modulator.

17. A receiver of a first communication device in an orthogonal frequency-division multiplexing (OFDM) system, comprising a digital demodulator, an inter-carrier interference (ICI) self-cancellation demodulator connected to said digital demodulator, and a fast Fourier transformer for fast Fourier transforming signals from a baseband filter and outputting to said ICI self-cancellation demodulator, said receiver further comprises:
an estimator in association with said receiver at work for estimating the maximum frequency offset and signal-noise power ratio (SNR) of signals transmitted from a second communication device via a transmission channel, the maximum frequency offset and SNR obtained from the estimation returning to the second communication device via the communication device where the receiver is located;
a signaling demodulator in association with said receiver at work for signaling demodulating signals that have been transformed by the fast Fourier transformer; and
a demodulation controller in association with said receiver at work for obtaining from signaling that have been demodulated by a signaling demodulator the working state, transmitted by the second communication device, of a digital modulator and an ICI self-cancellation modulator of the second communication device, determining the corresponding working state of said digital demodulator and said ICI self-cancellation demodulator, and controlling said digital demodulator and said ICI self-cancellation demodulator to work in accordance with said working state.

18. A receiver according to claim 17, wherein said digital demodulator is a difference phase-shift key (DPSK) demodulator.

19. A receiver according to claim 17, wherein said digital demodulator is a phase-shift key (PSK) demodulator.

20. A receiver according to claim 17, wherein said digital demodulator is a quadrature amplitude modulation (QAM) demodulator.

21. A receiver according to claim 17, wherein said estimator obtains from outputs of said digital demodulator signals sent from a baseband filter.

* * * * *